United States Patent Office 3,513,997
Patented May 26, 1970

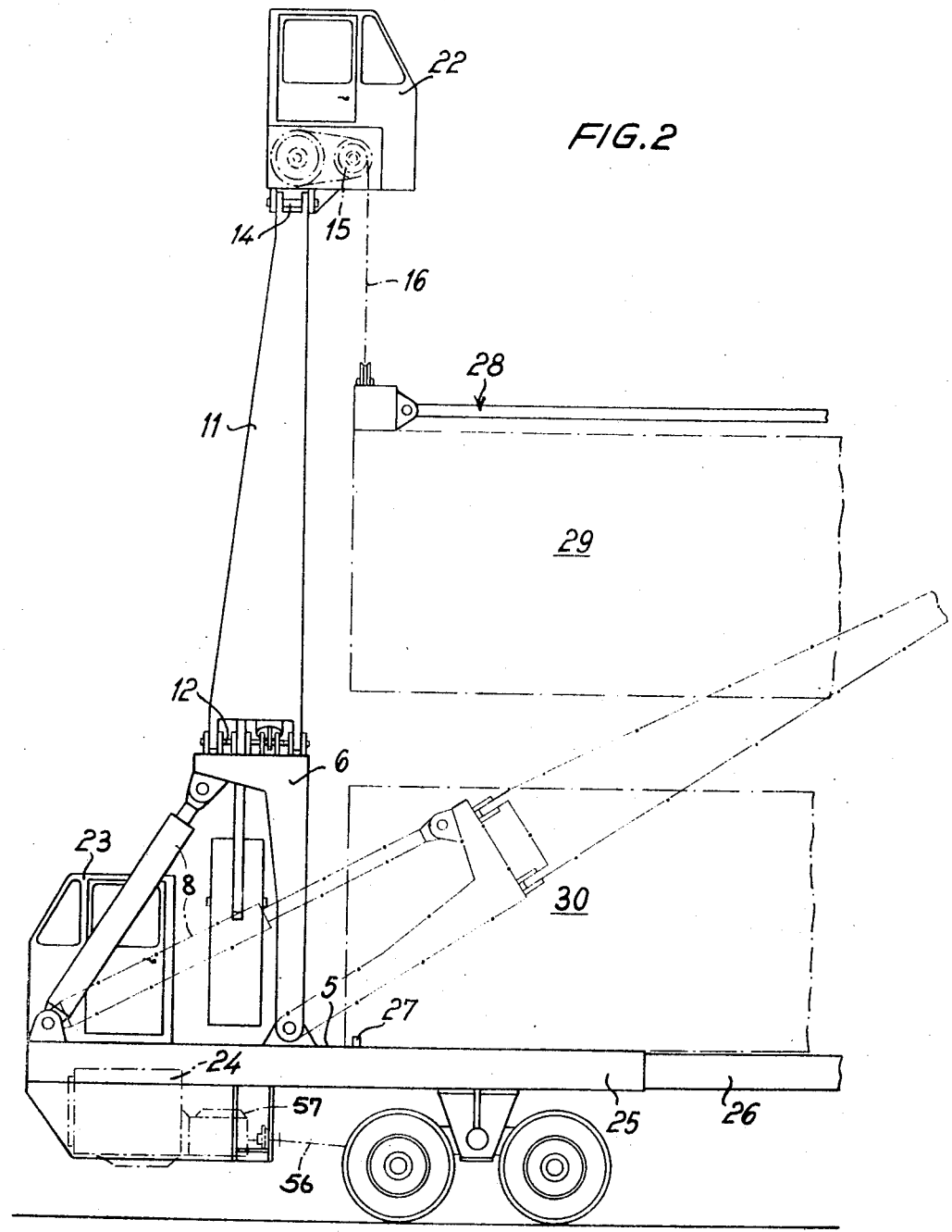

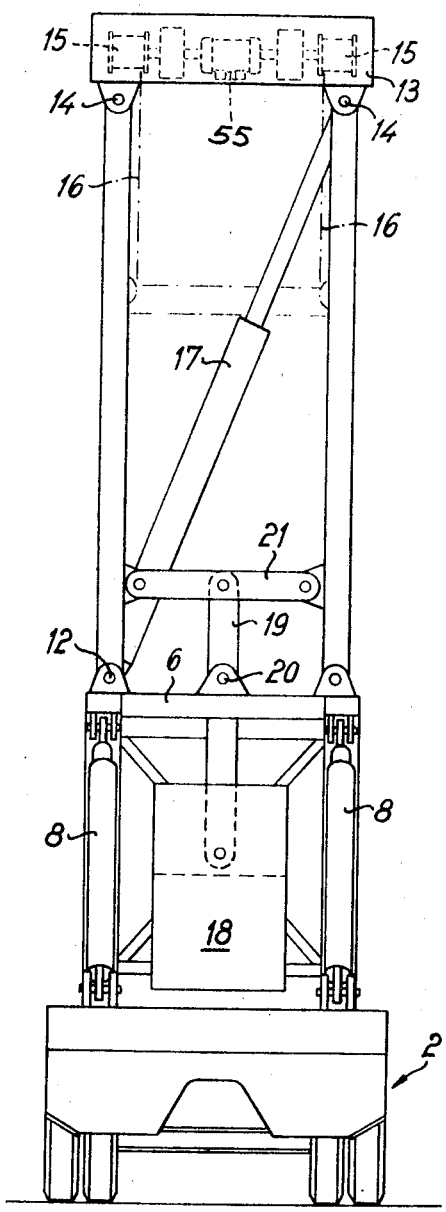

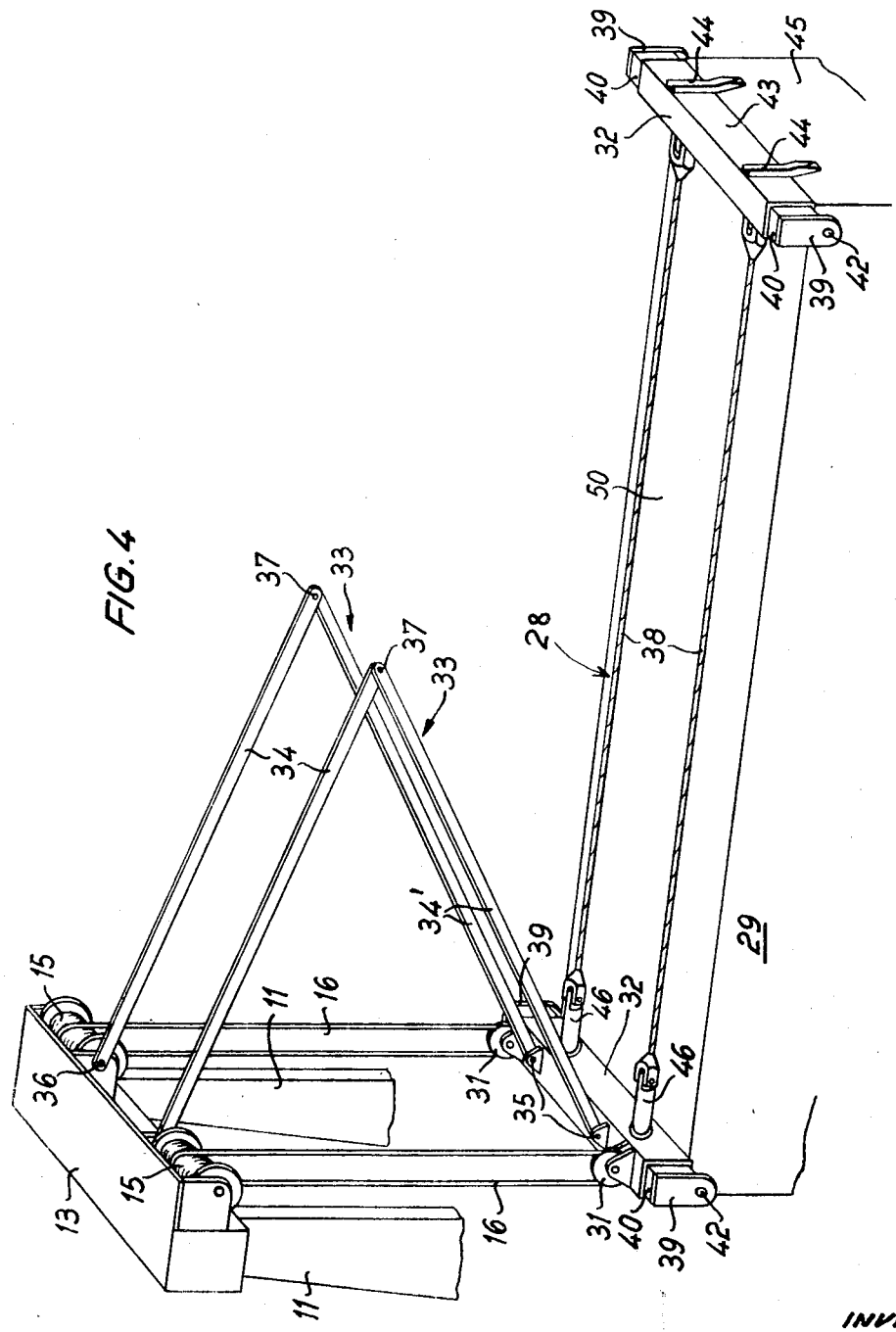

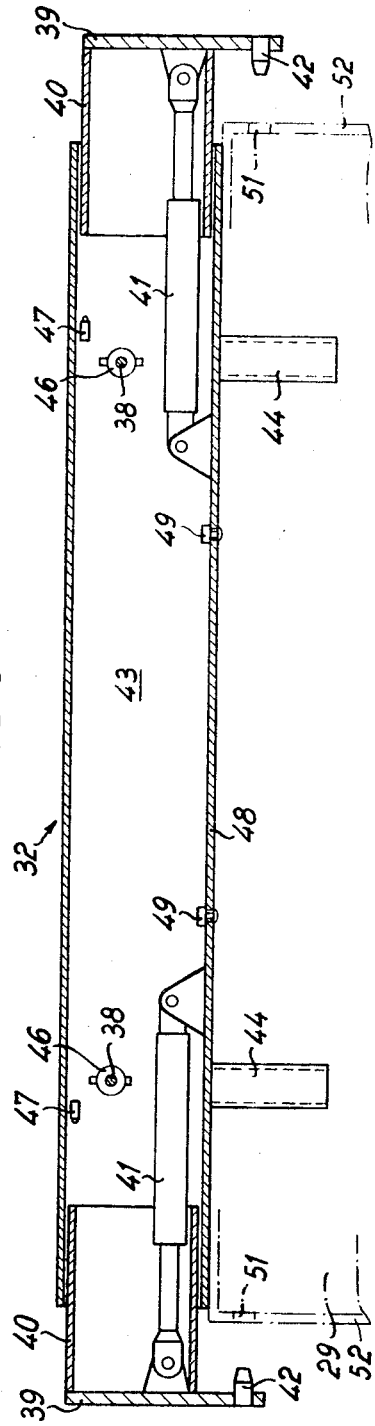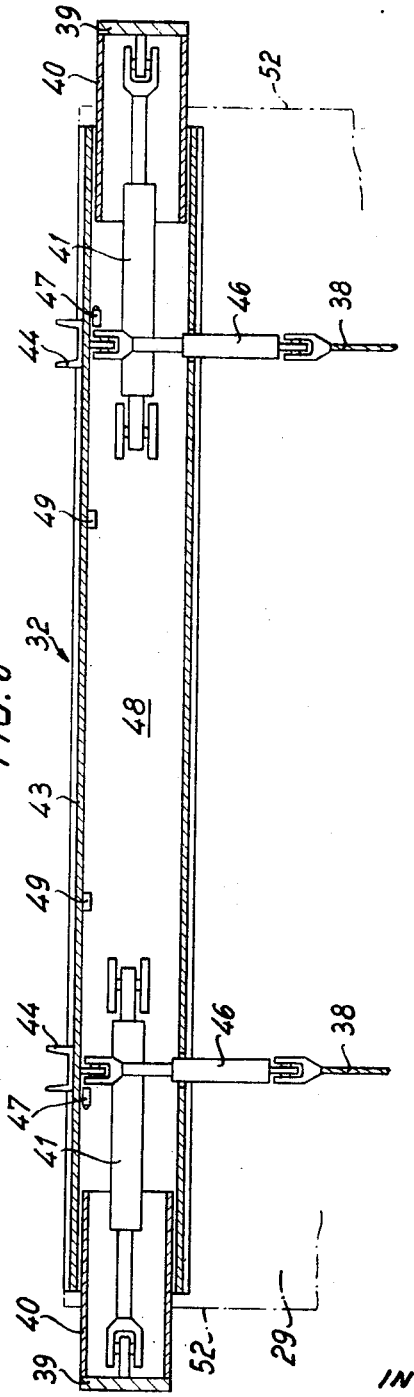

3,513,997
TRANSPORTER FOR CRATES
Heinrich W. Heyer, Straelen, and Heinz Spitzer, Hannover, Germany, assignors to Coles Krane G.m.b.H., Duisburg-Meiderich, Germany, a corporation of Germany
Filed Jan. 16, 1968, Ser. No. 698,330
Claims priority, application Germany, Jan. 17, 1967, C 41,238; Apr. 6, 1967, 1,271,939
Int. Cl. B60p 1/48
U.S. Cl. 214—77
14 Claims

ABSTRACT OF THE DISCLOSURE

A road vehicle designed for the lifting and/or transportation of large creates as two cranes symmetrically mounted on a common platform, the cranes having laterally swingable arms with confronting hoists for jointly lifting a crate placed alongside the vehicle to deposit it on the opposite side or on the platform; bases tiltable about parallel horizontal axes, transverse to the direction of vehicle motion, enable the cranes to be tipped inwardly toward the platform to facilitate road travel. A rectangular loading frame suspended from the hoisting cables of both cranes comprises two relatively movable end members, defining the minor sides of the rectangle, interconnected by two extensible cables defining the major sides; an unbalanced linkage, supplementing the hoisting cables, biases each end member outwardly to keep the connecting cables taut.

The present invention relates to a vehicle designed for the handling and transportation of large crates as used, for example, to ship goods on seagoing vessels.

Crates or containers of this type require, because of their bulk, special equipment for transporting them over trackless roadways, loading them on railroad flatcars and otherwise moving them from one location to another. For this purpose it is customary to provide such crates, which are usually of standardized prismatic shape, with recesses at their side and end faces designed to receive hooks or pins by which they can be hoisted and otherwise manipulated. Even so, however, vehicular cranes previously used for this purpose were not entirely satisfactory since, on the one hand, they required considerable room for maneuvering and, on the other hand, they generally could not handle more than one crate at a time.

The general object of the present invention is to provide an improved transporter for the purpose described, adapted to lift up large crates from locations alongside a track or roadway for deposition on, say, the opposite side thereof or on the vehicle itself.

A more particular object of the invention is to provide a road vehicle of this type which can be conveniently used to transport a plurality of such crates or large-size containers and which, if desired, can stack them (especially in their empty condition) in two or more tiers along the roadway.

A further object of the present invention is to provide a vehicular lifting assembly which, while being tall enough to permit the stacking of several (e.g. two or three) large crates, can be readily folded back onto the supporting vehicle to enable travel through tunnels and underpasses.

It is also an object of this invention to provide improved gripper means for anchoring the hoisting mechanism of such a transporter to a crate, advantageously in such a way as to inhibit the start of a lifting operation until the crate has been securely engaged at all points.

These objects are realized, pursuant to the present invention, by the provision of a transporter having two cranes mounted on a front portion and a rear portion of a wheeled platform of generally rectangular outline, the two cranes having standards which are laterally swingable and are provided on confronting sides (i.e. on the front side in the case of the rear crane and on the rear side in the case of the front crane) with hoisting devices jointly engageable with a crate to be lifted. In the swung-out position, in which these standards project laterally beyond the platform, the hoisting cables hang down alongside the vehicle so as to be readily anchorable to a crate positioned on an adjoining loading platform or on the ground; conversely, a crate previously engaged by the hoists may be deposited thereby beside the vehicle. A hoisted crate may also be placed by the symmetrically moving cranes on the vehicle platform therebetween, this platform advantageously including an extensible coupling between its front and rear portions to accommodate containers of different length.

In accordance with a more particular feature of this invention, each standard comprises a parallelogrammatic linkage constituted by a base, two parallel arms hinged thereto at the bottom and a cross-bar articulatedly interconnecting these arms at the top, the cross-bar remaining horizontal during lateral swings so as to be usable, e.g. in the case of the front crane, as a support for an operator's cabin. If the crane bases are elevated above the vehicle platform, the space underneath them may accommodate a counterweight serving to balance the standards in their swung-out position.

According to still another feature of the invention, the bases are tiltable about transverse axes toward each other so that the standards can be lowered toward the vehicle platform in the space between the two cranes. This tilting motion as well as the transverse swing of each standard may be effected by fluid-actuated means such as hydraulic jacks; the associated fluid pumps, whose distributing valves are electrically controlled from the operator's cabin, may be separately disposed at the front and rear portions of the vehicle and may be energized from a common generator powered by the engine which is preferably mounted on the front portion beneath a driver's cab. Thus, the two halves of the vehicle may have their separate hydraulic circuits and require only an electrical connection therebetween, apart from the adjustable mechanical coupling.

In accordance with yet a further feature of this invention, the hoisting devices of the two cranes are secured to opposite ends of a substantially rectangular loading frame, extending in the longitudinal direction of the vehicle, whose minor sides are defined by a pair of rigid end members with mobile extremities adapted to come to rest atop a crate and to grip its end and side faces. Thus, each end member may have one or more depending abutments for contacting a respective end face of the crate, other depending abutments being disposed on the mobile extensions of that member for sandwiching the crate between them; at least these latter abutments may be fitted with pins or other inward projections designed to enter the aforementioned recesses of the crate for positive engagement therewith. Switches on the loading frame may be actuated by the frate faces and/or by the mobile extensions to condition the hoists for operation only after the crate has been properly gripped by all the abutments described.

The end members reefrred to are preferably interconnected by flexible tie means, such as longitudinally extending cables which can be held taut in the absence of a crate by the simple expedient of supporting each end member not only on the lifting cables of the associated hoist but also on an unbalanced supplemental linkage, such as one or more pairs of articulated rods which are hinged to the end member at the bottom and to the top of the associated standard while forming a vertex pointing toward the opposite crane. The horizontal frame cables may also be tensionable by fluid-operated means, such as hydraulic jacks, to move the two end members toward each other after the frame has been properly aligned with a crate to be gripped thereby. In view of the independent mobility of the two crane standards, the frame may be lowered onto the crate in precise registry therewith even if the crate does not stand exactly parallel to the longitudinal axis of the vehicle.

The invention will be described in greater detail with reference to the accompanying drawing in which:

FIG. 2 is a side-elevational view of the front portion of the transporter shown in FIG. 1;

FIG. 3 is a rear-elevational view of the transporter;

FIG. 4 is a perspective view of a preferred loading frame carried on the transporter of FIGS. 1–3;

FIG. 5 is a sectional elevation of one of the end members of the frame of FIG. 4; and FIG. 6 is a sectional plan view of the end member shown in FIG. 5.

Figure 1:
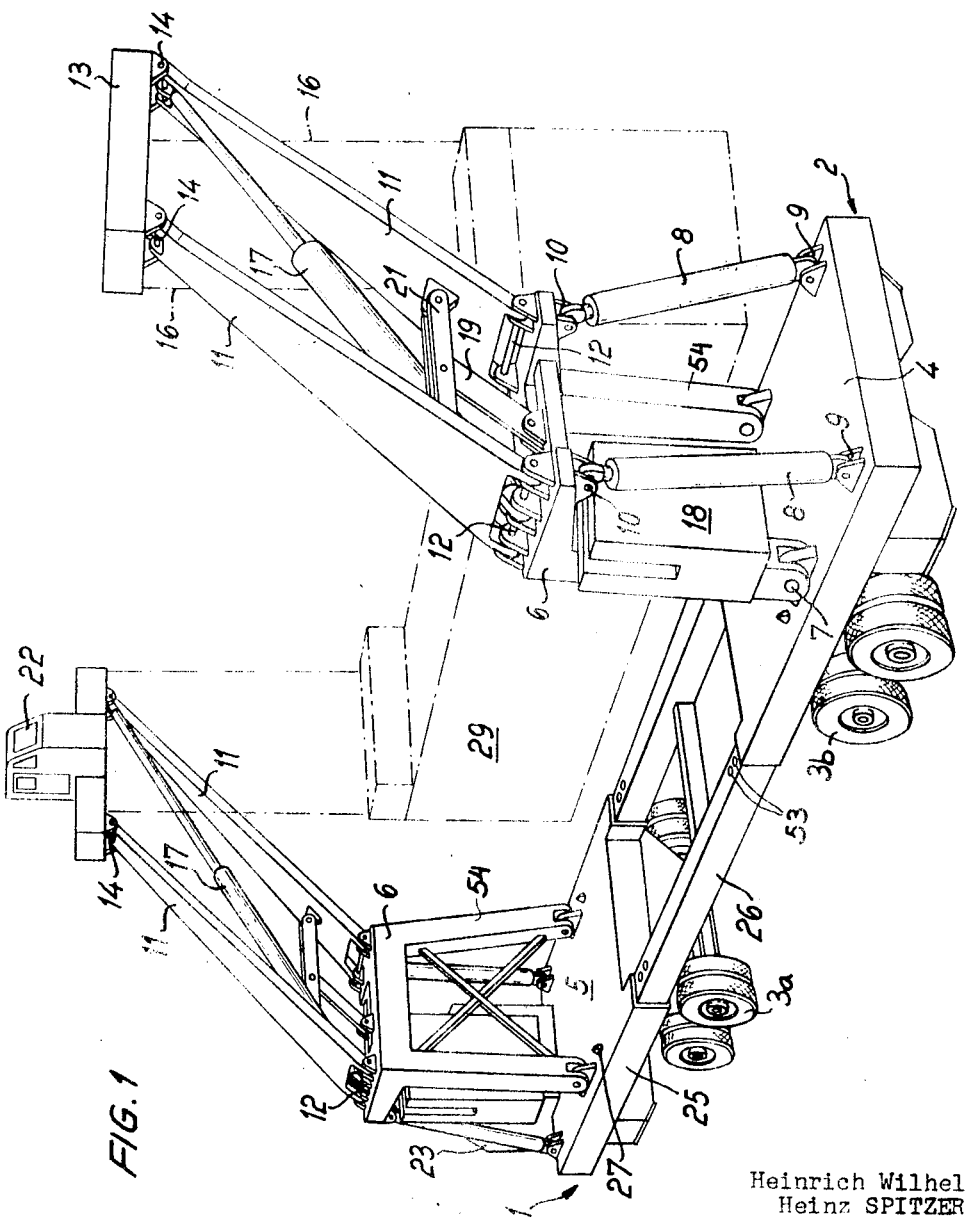
FIG. 1 is a perspective rear view of a transporter according to the invention.

In FIGS. 1–3 we show a transporter according to the invention comprising a front portion 1 and a rear portion 2 each including a respective platform section 5, 4, the two portions being supported on front wheels 3a and rear wheels 3b for travel along a highway. The sections 4, 5 of the rectangular platform are interconnected by a pair of longitudinally extending coupling bars 26 having holes 53 to receive pins 27 whose heads project upwardly from the platform to constitute locators for a crate 29 to be deposited thereon; if the crate is of standard width and provided on its underside with holes or recesses, the latter may be engaged by the heads of pins 27. As will be readily apparent, the sliding fit of bars 26 in guiding sleeves 25 of platform sections 4, 5 enables adjustment of the length of the vehicle to accommodate crates of different sizes.

In accordance with the present invention, a pair of identical cranes are supported on platform sections 4, 5 at the front and rear portions 1 and 2 of the vehicle. Each crane comprises a base 6 which is elevated above the platform by means of legs 54 that are pivotally secured to the platform by hinges 7 to enable a tilting of the base about an axis parallel to the minor sides of the rectangular platform. A pair of hydraulic jacks 8 are articulated at 9 to the platform and at 10 to the cantilevered outer edge of base 6. Thus, extension of the jacks 8 tilts the rear base 6 forwardly or the front base rearwardly as illustrated in dot-dash lines in FIG. 2. Base 6 supports a swingable standard in the from of two parallel upstanding arms 11 which are hinged to the base at 12 and to an upper cross-bar 13 at 14; an additional cross-brace 21 is also articulated to these arms at an intermediate level. A lever 19 is pivoted at its upper end to the midpoint of brace 21 and also has a fulcrum 20 at the center of base 6, the lower end of this lever being attached to a counterweight 18 which balances the standard 11, 13 in its laterally swung-out position as illustrated in FIG. 1. Cross-bar 13, which retains its horizontal position during such swings, accommodates in its interior a hoisting device comprising a pair of capstans 15 and a drive motor 55 therefor, cables 16 being wound on these capstans and anchored to a loading frame 28 engaging a crate 29 to be lifted. The transverse swing of the arms 11 is controlled by a double-acting hydraulic jack 17 articulated at diametrically opposite ends to the parallel ogrammatic linkage 6, 11, 13. With the jack 17 fully extended, the arms 11 swing to the right as illustrated in FIG. 1; when the jack is fully retracted, they swing leftward to substantially the same extent. FIG. 3 illustrates an intermediate position of the jack in which the arms are upright.

The cross-bar 13 of the front crane supports an operator's cabin 22 which contains the necessary controls for jacks 8, 17 and which gives its occupant a clear view of the working area of the transporter. A driver's cab 23 is mounted at the front of the vehicle and contains the usual implements, such as a steering wheel for the dirigible front wheels 3a and the controls for the vehicle engine 24 (e.g. a Diesel motor) which, as shown in FIG. 2, may be disposed underneath the cab 23 and coupled with the front wheels 3a via a transmission 56. At 57 there is shown a generator for supplying power to the electric components of the system, including the two hoist motors 55; the corresponding switches are also located in the operator's cabin 22.

From the preceding description it will be apparent that the crane standards 11, 13 can be used to move a crate 29 from one side of the vehicle to the other, to deposit the crate on the platform 4, 5 or even to place it on another crate 30 already resting there. It is also possible to use the dual cranes for the stacking of as many as three crates alongside the vehicle or for placing them on an elevated platform or pedestal. When the cranes are tipped inwardly, as illustrated for the front crane in FIG. 2, the vehicle can clear overhead obstructions such as tunnels or underpasses which would otherwise be impassable.

FIGS. 4–6 show a preferred construction for a loading frame 28 adapted to be used in conjunction with the vehicle of FIGS. 1–3 when handling a crate 29. This frame, of rectangular shape similar to the outline of platform 4, 5, comprises two rigid end members 32 in the form of tubular horizontal bars carrying rollers 31 enveloped by the hoisting cables 16 of the respective crane. Each bar 32 is additionally suspended by an unbalanced linkage 33 comprising an upper pair of rods 34, hinged at 36 to the cross-bar 13 of the associated crane, and a lower pair of rods 34' hinged at 35 to the member 32; the two rod pairs 34, 34' are articulatedly interlinked at 37 to form vertices pointing toward the opposite crane, i.e. rearwardly in the case of the front linkage illustrated in FIG. 4. The corresponding rear linkage, which is of symmetrical configuration, has not been illustrated.

End members 32 are interconnected by a pair of horizontal cables 38 anchored to hydraulic jacks 46 which are also controlled from cabin 22; in the extended position of these jacks slack developing in cables 38 is taken up by the fact that the unbalanced linkages 33 urge the two end members 32 apart.

As best seen in FIGS. 5 and 6, each end member 32 is provided at its extremities with a pair of mobile extensions 40 which can be slid in and out by hydraulic jacks 41 likewise controllable by the operator in cabin 22, each of these extensions terminating in a depending lug 39 carrying an inwardly directed pin 42. Other lugs 44 depend from the outer wall 43 of bar 32 so as to contact an end face 45 of crate 29 when the bar 32 rests on the top 50 thereof. In the proper gripping position of member 32, pins 42 are aligned with holes 51 in the side faces 52 of crate 29 which they enter upon retraction of the jacks 41. Limit switches 47 on the inside of wall 43 are tripped by the extensions 40 in their retracted positions to indicate that the pins 42 have entered the holes 41 of a standard-size crate, provided the latter has been properly positioned with its end face 45 next to lugs 44 so that other limit switches 49 on the lower wall 48 of member 42 are also actuated by the crate edge. Hoist motors 55 can be operated only when all the limit switches 47, 49 on both sides of the frame 28 have been tripped in this manner.

If the width of crate 29 is variable, the limit switches 47 could be relocated from bar 32 onto lugs 39 for actuation by the sides 52 of the crate rather than by the extension sleeves 40. This and other modifications, readily apparent to persons skilled in the art, are intended to be encompassed within the spirit and scope of the invention.

What is claimed is:
1. A transporter for large crates, comprising:
   a wheeled platform of generally rectangular outline with longitudinal separated front and rear portions;
   a pair of cranes respectively mounted on said front and rear portions, said cranes having laterally swingable standards provided on confronting sides with respective hoisting means for a crate to be lifted;
   a horizontal loading frame suspended from said hoisting means between said cranes, said frame being substantially rectangular with major sides parallel to those of said platform and including a pair of rigid end members at its minor sides and tensionable flexible tie means interconnecting said end members, said hoisting means including respective cables anchored to said end members;
   and operating means for jointly moving said standards between a swung-out position projecting laterally beyond said platform and an upright position above said platform.

2. A transporter as defined in claim 1, further comprising supplemental link means displaceably connecting said end members with said standards under longitudinal outward pressure for maintaining said tie means under tension.

3. A transporter as defined in claim 2 wherein said supplemental link means includes at least one lower link hinged to each end member and at least one upper link hinged to the top of each standard for swinging in a vertical plane, corresponding upper and lower links being articulatedly interconnected at a vertex pointing toward the opposite crane.

4. A transporter as defined in claim 1 wherein said tie means comprises a set of horizontal cables and hydraulic jacks for varying the effective length thereof.

5. A transporter as defined in claim 1 wherein each of said end members comprises a transverse horizontal bar provided with mobile extensions at its extremities and with hydraulic means for moving said extensions toward each other, said bar being positionable atop a crate to be lifted and being provided with first depending abutment means for contacting an end face of the crate, said extensions being provided with depending second abutment means for contacting the side faces of the crate, said second abutment means carrying inwardly directed projections engageable in recesses of said side faces near said end face.

6. A transporter as defined in claim 5 wherein said end members are provided with switch means operative in the contacting positions of said first and second abutment means for enabling said hoisting means.

7. A transporter as defined in claim 1 wherein said platform includes adjustable coupling means for varying the distance between said front and rear portions.

8. A transporter for large crates, comprising:
   a wheeled platform of generally rectangular outline with longitudinally separated front and rear portions;
   a pair of cranes respectively mounted on said front and rear portions, said cranes having laterally swingable standards provided on confronting sides with respective hoisting means for a crate to be lifted, each of said cranes including a base supporting the standard thereof, said standard including a pair of parallel arms hinged to said base at their bottom and a cross-bar articulatedly interconnecting said arms at their top, said base, arms and cross-bar forming a parallelogrammatic linkage;
   an operator's cabin on the cross-bar of the crane of said front portion;
   and operating means for jointly moving said standards between a swung-out position projecting laterally beyond said platform and an upright position above said platform.

9. A transporter as defined in claim 8 wherein said operating means comprises a hydraulic jack anchored to diagonally opposite corners of said parallelogrammatic linkage.

10. A transporter for large crates, comprising:
   a wheeled platform of generally rectangular outline with longitudinally separated front and rear portions;
   a pair of cranes respectively mounted on said front and rear portions, said cranes having laterally swingable standards provided on confronting sides with respective hoisting means for a crate to be lifted, each of said cranes including a base supporting the standard thereof, said standard including a pair of parallel arms hinged to said base at their bottom and a cross-bar articulatedly interconnecting said arms at their top, said base, arms and cross-bar forming a parallelogrammatic linkage, said linkage being provided with a transverse brace hinged to said arms at an intermediate level, said base being elevated above said platform, each crane further including a lever pivoted midway between said arms to said base and to said brace, said lever terminating below said base in a counterweight for balancing said standard in its swung-out position;
   and operating meas for jointly moving said standards between a swung-out position projecting laterally beyond said platform and an upright position above said platform.

11. A transporter as defined in claim 10 wherein the bases of said cranes are pivotally mounted on said platform for swinging movement toward each other about axes parallel to the minor sides of said outline whereby the corresponding standards can be tipped toward said platform between said bases.

12. A transporter as defined in claim 10 wherein said cranes are provided with hydraulic jack means for swinging said bases toward each other.

13. A transporter as defined in claim 10 wherein said front portion is provided with a driver's cab, an engine controllable from said cab and a set of wheels driven from said engine.

14. A transporter for large crates, comprising:
   a wheeled platform of generally rectangular outline with longitudinally separated front and rear portions and with adjustable coupling means for varying the distance between said front and rear portions; said coupling means including a pair of lateral bars, said front and rear portions being provided with locking pins engageable with said bars, said locking pins projecting upwardly from said platform for engagement with a crate deposited thereon;
   a pair of cranes respectively mounted on said front and rear portions, said cranes having laterally swingable standards provided on confronting sides with respective hoisting means for a crate to be lifted;
   and operating means for jointly moving said standards between a swung-out position projecting laterally beyond said platform and an upright position above said platform.

References Cited

UNITED STATES PATENTS

| | | | |
|---|---|---|---|
| 1,399,053 | 12/1921 | Fitch | 294—67 |
| 2,660,319 | 11/1953 | Dorland | 214—15 |
| 1,435,604 | 11/1922 | Harrington. | |
| 2,656,058 | 10/1953 | Foote. | |
| 2,781,924 | 2/1957 | Hughes | 214—77 |
| 2,935,214 | 4/1960 | Fly | 214—77 |
| 2,996,206 | 8/1961 | McKee | 214—75 X |
| 3,174,630 | 3/1965 | Tantlinger et al. | |
| 3,057,490 | 10/1962 | Sauer | 214—77 |

FOREIGN PATENTS

| | | |
|---|---|---|
| 1,335,765 | 7/1963 | France. |
| 1,489,605 | 6/1967 | France. |

GERALD M. FORLENZA, Primary Examiner

R. J. SPAR, Assistant Examiner

U.S. Cl. X.R.

212—8; 294—67; 280—106